Jan. 23, 1940.   C. E. STAHL   2,188,270
THERMIONIC TUBE
Filed June 9, 1934   2 Sheets-Sheet 1

INVENTOR
CHARLES E. STAHL
BY
Brandton, Whitcomb & Davies
ATTORNEYS

Jan. 23, 1940.  C. E. STAHL  2,188,270
THERMIONIC TUBE
Filed June 9, 1934  2 Sheets-Sheet 2
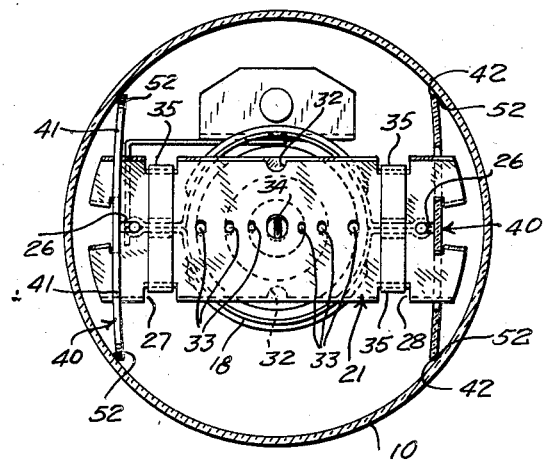
Fig. 2.
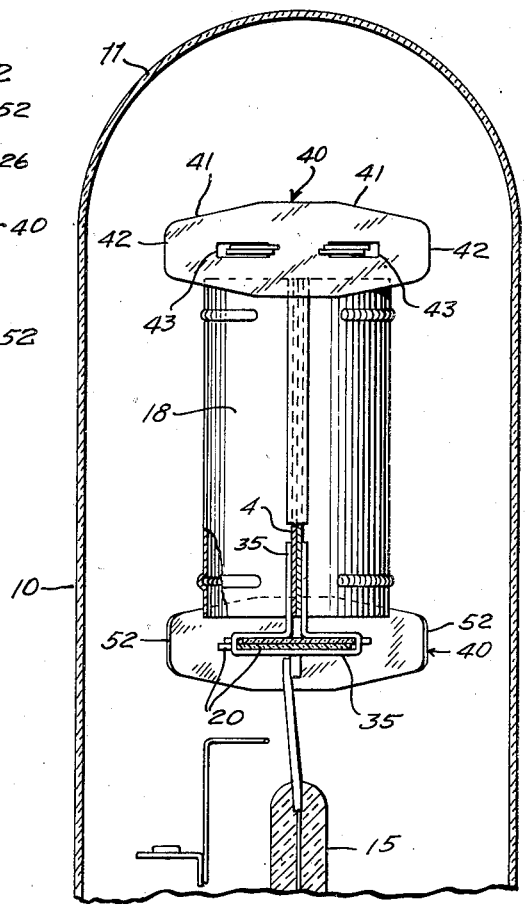
Fig. 3.
Fig. 4.
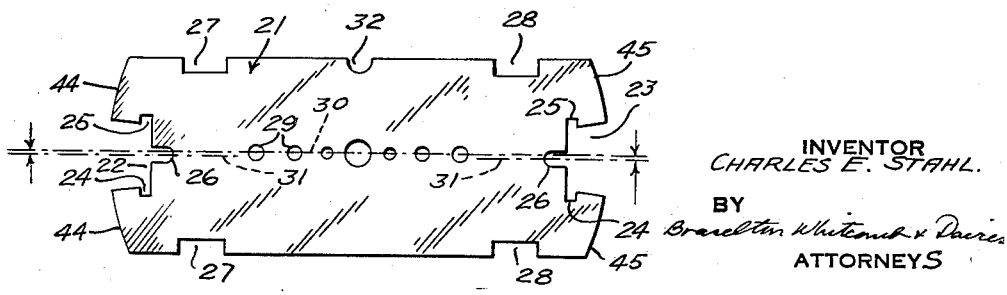
INVENTOR
CHARLES E. STAHL.
BY
ATTORNEYS Patented Jan. 23, 1940

2,188,270

UNITED STATES PATENT OFFICE 2,188,270

THERMIONIC TUBE

Charles E. Stahl, Montclair, N. J., assignor to Arcturus Development Company, Newark, N. J., a corporation of Delaware Application June 9, 1934, Serial No. 729,747

11 Claims. (Cl. 250—27.5)

This invention relates to improved means for supporting the element assembly of thermionic devices such as amplifying, detecting, rectifying and oscillating tubes.

In the manufacture of thermionic devices it has been usual, heretofore, to mount the electronic valve element assembly on a single stem or supporting means within the envelope, there being stiff metal rods or standards projecting from the stem to which the various elements of the assembly are attached. This conventional form of mounting of the element assembly with no support at the sides or at one end not only permits microphonic vibration of the assembled elements but also deformation and displacement occur due to jar or shock applied either to the tube envelope or the tube support. A mounting of this type is particularly faulty when employed in electron tubes used on automobiles, airplanes, ships and other vibratory or movable carriers.

It is a primary object of the present invention therefore to provide a free or floating means for mounting the tube element assembly on the envelope wall with practical independence of the stem as a means of support.

It is an important object of the invention also to provide a new and improved means for supporting the element assembly of a thermionic tube in such manner as to dampen or deaden vibration of the tube elements.

Another object is to utilize an element assembly support which will resist deformation due to jar of either a continuous or intermittent nature.

Still another object is to provide a tube structure in which the individual tube elements are held against axial movement and the element assembly is held against movement relative to the tube envelope.

A further object of the invention is the utilization of soft or yielding supports between stem and element assembly which will not readily transmit disturbances from the base to the tube elements which cause microphonic effects.

An object of the invention also is the employment of plural supporting members between the tube element assembly and envelope which prevent bowing or bending of the element assembly within the tube.

Additional objects contemplate provision of side contact supports which are resilient and adjust themselves to compensate for varying tube diameters, and of a tube having uniform diameter for permitting easy insertion of the element assembly.

Further objects will appear from consideration of the following description and the accompanying drawings, in which:

Fig. 2 is a plan view showing the assembly supports in contact with the tube of the envelope and taken along line 2—2 of Fig. 1;

Fig. 3 is a sectional view along the line 3—3 of Fig. 1; and

Fig. 4 is a detail showing the holding plate for the elements of the tube assembly.

Figure 1:
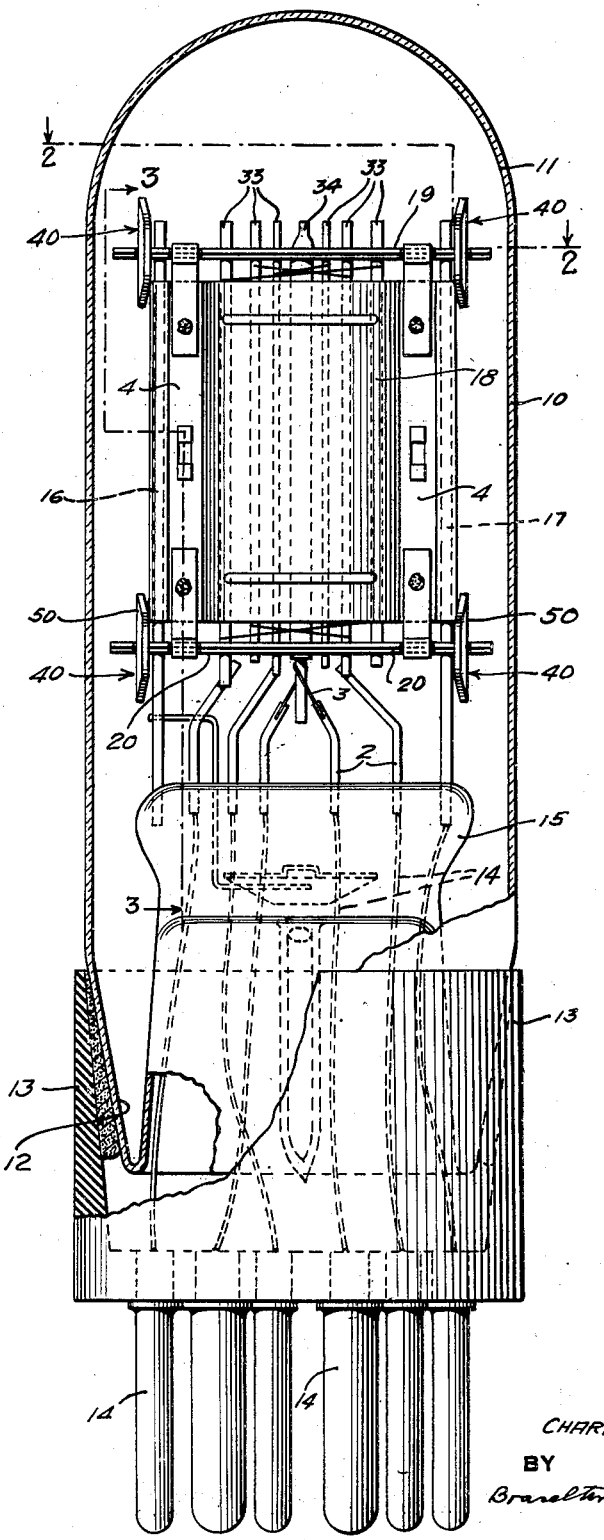
Fig. 1 is an elevation of a thermionic tube equipped with my element assembly supporting devices.

In application Serial No. 729,768, filed June 9, 1934, now Patent No. 2,048,257, there is shown apparatus for securing the tube element rods in fixed position. The present invention includes not only this apparatus but additional means for preventing microphonic tube effects, as will now be described.

For purposes of description and illustration I have shown my invention as applied to a radio tube, although it will be evident that the invention is equally applicable to any unit or assembly of elements which are supported within a closed envelope. The envelope 10 is of cylindrical formation known in the art as the type T instead of the usual TS or pear-shaped type, the outer end having a dome-shaped closure and the inner end having the constricted portion 12 adapted to be inserted within the base member 13 to the bottom of which are applied the various electrical terminals 14. Mounted on the stem 15 within the base of the tube are the laterally positioned standards 16 and 17 to which is fastened the anode 18 which is positioned between the two standards 16 and 17, as shown in Fig. 1. These standards are of semi-rigid copper or nickel rods and sufficiently soft as to bend readily and so as not to transmit disturbances from the base.

As means for supporting and rigidly holding the various element support rods and the cathode I utilize the double plate means shown in the drawings, a pair of plates 19 being positioned adjacent the top of the standards 16 and 17, and a second pair 20 being positioned adjacent the stem. Each plate 21 of each pair, as shown in Fig. 4, consists of an elongated plate of mica or other suitable insulating material having end openings 22 and 23 which are provided with inwardly converging edges terminating in lateral notches 24 and 25 and terminal notches 26. The plate is also provided with opposed notches 27 and 28 for securing the two plates of a pair together in a manner which will be hereinafter described.

Intermediate the recesses 22 and 23 on one side of the axial line joining the recesses are a plurality of apertures 29 which lie along the line 30 offset from the median or axial line 31 intermediate the recesses 26. These apertures, as will be shown hereinafter, are for the reception of the support rods of the various grids and also for the ends of the cathode. There is also provided a notch 32 on the edges of the plate on that side thereof on which the apertures 29 are positioned. This is for the purpose of preventing error in the assembly of the tube.

In the assembly of the holding means the two plates 21 are positioned one on the other with the offset apertures 29 on opposite sides of the axial line 31, as shown in Fig. 2, with the notch 32 on opposite sides of the line 31, the standards 16 and 17 in the recesses 26, and the apertures in registry. The various support rods 33 and the cathode 34 are then positioned as illustrated in Fig. 1. The straps 35, which may be of nickel or Swedish iron or similar flexible material, are then passed over the top of the outer plates of the pairs 19 or 20 and through the notches 27 or 28 and underneath the inner plate, and the ends are then welded to the lateral wings 4 of the tubular plate 18. When these plates are tightened into position the separate plates 21 of each pair are moved transversely with reference to each other and the axial line 31 in a direction to force the edges of the apertures 29 against the enclosed support rod or cathode and consequently provide in this manner a rigid grip on these elements, whereby axial movement of the support rods and cathode due to jar or any other reason is effectively prevented.

In accordance with the present invention also I provide means for supporting the tube element assembly from the envelope wall. As shown, for example, in Figs. 1, 2 and 3, I provide a plate 40 of mica or of some other resilient and insulating substance having converging ends 41 which terminate in parallel edges 42, these edges being adapted to lie along the interior surface of the cylindrical envelope 10, parallel to the tube axis. As is shown in Figs. 2 and 3, the plate 40 is provided with two spaced slots 43 positioned along the axis of the plate and symmetrically disposed with reference to the center thereof. These slots are adapted to permit entry of the projecting ends 44 or 45 formed on the ends of the plate 21, and since the distance between the slots 43 is somewhat greater than the distance between the inner ends of the recesses 22 and 23 the plate 40 is sprung into place in the notches 25 and 26, these notches thereby yieldingly retaining the mica plate 40 in position on the ends of the plate 21. Attention is directed to the fact that the width of the slots 43 is slightly greater than the thickness of the plate 21 or, where two plates are used to form a pair as hereinabove described, the width of the slot is somewhat greater than the combined thickness of the pair of plates. This permits a slight pivotal movement of the plate with reference to its support sufficient to permit adjustment to slight variations in the curvature or alignment of the envelope wall.

It is particularly pointed out that the plates 40 are mounted on the ends of the plate 21 in such manner as to prevent accidental removal thereof in the tube because of axial adjustment of the element assembly in the process of manufacture. This is considered to be an important improvement over the arrangement of the prior art.

As hereinabove mentioned, side support plates are applied not only at the upper or outer end of the element assembly but also at the inner or base end adjacent the stem. In Fig. 1 of the drawings the plates 50 are illustrated, these plates being the exact counterpart of the plates 40 shown at the outer end of the tube. In both instances when the assembly is positioned within the envelope the ends 52 of the side plates 40 and 50 contact yieldingly against the tube wall, and consequently since the whole plate is of resilient material the whole plate bows or bends and thus an elastic resistance against lateral movement of the element assembly is provided at both ends of said assembly.

The standard 17 as well as the filament 3 and certain of the support rods are connected to the base terminals 14 by appropriate connectors 2 which are also of soft metal.

As above stated in order further to avoid vibratory effects due to jar from points external to the envelope I employ such metal in the standards 16 and 17 as will lessen vibration. For such purpose metal that does not readily transmit vibration such as soft nickel is employed and the whole standard, or only the length between the stem and lower support plate 20, may be formed of this material. The purpose of such metal structure is apparent in that the tuning-fork effect arising from lateral impact or jar on the external wall of the envelope does not develop and consequently the tubes are not microphonic and are more suitable for uses on automobiles and other vibratory carriers.

Instead of semi-rigid rods 2, 16 and 17 I may employ alternatively flexible or pig-tail connections between the element assembly and stem, it being preferable in such arrangement to provide a similar connection between the assembly and envelope at the outer end 11 of the tube.

The stem or end connections to the assembly constitute in any event merely secondary holding means as against the primary holding and supporting means of the side plates 40.

While I have shown the use of side support plates and element supporting means as applied to a radio tube, it is evident that the invention is applicable to various other thermionic or other devices which have one or more elements positioned on a base support within a closed envelope. The use of the cylindrical envelope makes possible the ready insertion and positioning of the element assembly and facilitates the use of the side plates at the base of the assembly.

The use of mica for the side plates has been mentioned although it is permissible to employ other insulating substances. Also, metal plates might be employed which are properly insulated from the various supports of the tube. I prefer to use mica, however, inasmuch as it is electrically non-conducting and has low heat conductivity and possesses the desired resiliency.

Various modifications of the invention may be made other than those hereinabove mentioned provided they come within the scope of the claims hereto appended.

I claim as my invention:

1. A thermionic tube comprising a tubular envelope, an element assembly extending along the lenght of said envelope, and means at both ends of said element assembly for resisting lateral movement thereof, each of said means comprising two mica plates oppositely attached to the element assembly at points intermediate their ends, the ends of the plates contacting resiliently against the inner wall of the envelope.

2. A thermionic tube comprising a tubular envelope, an element assembly extending along the length of said envelope, means at both ends of said element assembly for resisting lateral movement thereof, each of said means consisting of resilient insulating plates attached to the assembly at separated points, the ends of the plates contacting resiliently with the wall of the envelope, said envelope preventing detachment of the plates when the plates are positioned inside the envelope.

3. A thermionic tube comprising a cylindrical envelope, a tubular anode extending axially along said envelope, an element assembly including grid and cathode elements within said anode, means at both ends of said element assembly for holding said elements fixedly in relation to said anode and a plurality of resilient plates mounted on said element holding means at both ends of said assembly for retaining said assembly in position within the envelope, said plates being attached to the assembly holding means at points intermediate their ends, the ends of the plates contacting resiliently against the inner surface of the envelope.

4. A thermionic tube comprising a sealed cylindrical envelope, a tubular anode within the envelope, a plurality of grid support rods positioned within said anode with their ends protruding beyond the anode ends, a pair of elongated mica holding plates at each end of said anode, each plate having a line of apertures displaced from the axis of the plate, the apertures of one plate being on the side of a line joining the plate axis opposite to the apertures of the other plate, and each of the apertures of one plate registering with the apertures of the other plate, means for forcing the edges of said holding plate apertures against the sections of the grid support rods inserted therein and for securing the plates to the anode, and additional means for holding the element structure including the anode and grid support rods in position within the envelope, said last named means comprising a plurality of mica plates attached separately at points intermediate their ends to each of the two pairs of the mica holding plates and having their ends resiliently contacting against the inner surface of the envelope.

5. A shock absorber for the elements of a thermionic device comprising an elongated mica plate having a large central portion and narrowed end portions with converging side edges and parallel end edges, said mica plate having two narrow rectangular apertures symmetrically located on either side of the central point of the plate along the plate axis, the long axis of the apertures lying on the axis of the plate, said apertures being adapted for insertion over supports secured to the elements of the thermionic device.

6. A thermionic tube comprising an elongated tubular envelope, an element assembly extending along the axis of said envelope, a grid rod holding plate mounted transversely on the end of said element assembly, said plate being attached to and having ends projecting beyond said assembly, said plate ends being bifurcated by an axial recess having inwardly converging edges and laterally offset recesses, and a resilient assembly holding plate having axially formed apertures resting in the notches of said bifurcated plate end whereby the assembly holding plate is positively restrained from movement relative to the assembly along the tube axis, the ends of said assembly holding plate contacting against the inner surface of the envelope.

7. A thermionic tube comprising a cylindrical envelope, a re-entrant stem positioned at one end thereof, anode support rods within the envelope, a tubular anode secured to said rods, grid support rods within and extending beyond either end of said anode, a supporting plate secured to the anode at each end for maintaining the grid support rods fixedly in position relative to the anode, circuit connections within said stem, a plurality of yieldable, non-resilient metal connections between said circuit connections and the adjacent ends of said grid support rods, and means interposed directly between the envelope wall and the supporting plates for maintaining the grid and anode structure in place, said means comprising a plurality of resilient plates secured to the grid support plates and having the ends thereof contacting with the envelope wall, and said yieldable metal connections and resilient plates constituting the sole connections between the assembly and envelope.

8. A thermionic tube comprising an envelope, an element assembly including a plurality of support rods within the envelope, single means for clamping all of the support rods together in fixed relationship at one end of the element assembly, and support means for the assembly interposed at spaced points along the assembly between the assembly and the tube wall.

9. A thermionic tube comprising a tubular envelope, an element assembly including end plates with apertures therein and support rods extending parallel to the axis of the envelope and penetrating said apertures, frictional means for preventing axial movement of the support rods of said element assembly through the apertures of said plates, additional means interposed directly between the assembly and envelope for positioning said assembly centrally in the envelope and flexible, non-resilient connections between said stem and some of the support rods.

10. A thermionic tube comprising a tubular envelope, an element assembly extending along the length of said envelope, support means at both ends of said element assembly for resisting lateral movement thereof, each of said means comprising two mica plates oppositely attached to the element assembly at points intermediate their ends, the ends of the plates contacting resiliently against the inner wall of the envelope, and additional support means comprising a flexible, non-resilient connection between one end of the assembly and the adjacent end of the envelope.

11. A thermionic tube comprising a tubular envelope, an element assembly extending along the length of said envelope, and means at both ends of said element assembly for resisting lateral movement thereof, each of said means comprising resilient plates oppositely attached to the element assembly at points intermediate their ends, the ends of the plates contacting against the inner wall of the enevlope, and additional support means comprising a flexible, non-resilient connection between one end of the assembly and the adjacent end of the envelope.

CHARLES E. STAHL.